(12) United States Patent
Lin

(10) Patent No.: US 11,134,228 B1
(45) Date of Patent: *Sep. 28, 2021

(54) POINT-TO-POINT VISUAL COMMUNICATIONS IN A SECURITY MONITORING SYSTEM

(71) Applicant: Alarm.com Incorporated, Tysons, VA (US)

(72) Inventor: Lang Lin, Potomac, MD (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,000

(22) Filed: Apr. 17, 2020

Related U.S. Application Data

(63) Continuation of application No. 16/131,268, filed on Sep. 14, 2018, now Pat. No. 10,638,096.

(60) Provisional application No. 62/558,386, filed on Sep. 14, 2017.

(51) Int. Cl.

| | |
|---|---|
| *H04N 7/18* | (2006.01) |
| *G08B 13/196* | (2006.01) |
| *G07C 9/32* | (2020.01) |
| *G08B 21/22* | (2006.01) |

(52) U.S. Cl.
CPC ............. *H04N 7/186* (2013.01); *G07C 9/32* (2020.01); *G08B 13/19656* (2013.01); *G08B 21/22* (2013.01)

(58) Field of Classification Search
CPC .... G07C 9/32; G08B 13/19656; G08B 21/22; H04N 7/186

USPC ........ 348/152, 143, 148, 151, 153, 156, 161
See application file for complete search history.

(56) References Cited

U.S. PATENT DOCUMENTS

| | | | |
|---|---|---|---|
| 8,823,795 B1* | 9/2014 | Scalisi | H04N 7/186 |
| | | | 348/143 |
| 2003/0202099 A1 | 10/2003 | Nakamura et al. | |
| 2004/0257336 A1 | 12/2004 | Hershkovitz et al. | |
| 2013/0120571 A1 | 5/2013 | Lee et al. | |
| 2013/0208109 A1 | 8/2013 | Landry | |
| 2014/0098247 A1* | 4/2014 | Rao | H04W 4/20 |
| | | | 348/207.1 |
| 2015/0244989 A1 | 8/2015 | Liao | |
| 2015/0288928 A1 | 10/2015 | McCoy et al. | |
| 2016/0086461 A1 | 3/2016 | Geng et al. | |
| 2017/0034485 A1 | 2/2017 | Scalisi | |
| 2018/0129885 A1* | 5/2018 | Potter | G08B 13/19628 |

(Continued)

*Primary Examiner* — Robert Chevalier
(74) *Attorney, Agent, or Firm* — Fish & Richardson P.C.

(57) ABSTRACT

A monitoring system includes a doorbell unit that includes a camera and a display and that is configured to receive a request to access the property. The monitoring system includes a monitor control unit that is configured to determine an authentication protocol for determining whether to grant the visitor access to the property. The monitor control unit generates a first image and transmits authentication data to a computing device. The monitor control unit provides the first image and instructions to output the first image on the display of the doorbell unit. The monitor control unit receives a second image captured by the camera of the doorbell unit. The monitor control unit determines whether the second image includes a representation of data that is based on processing the first image in combination with the authentication data. The monitor control unit grants or denies the visitor access to the property.

20 Claims, 5 Drawing Sheets

(56) References Cited

U.S. PATENT DOCUMENTS

2018/0139332 A1 5/2018 Kerzner
2018/0341835 A1 11/2018 Siminoff

* cited by examiner

POINT-TO-POINT VISUAL COMMUNICATIONS IN A SECURITY MONITORING SYSTEM

CROSS-REFERENCE TO RELATED APPLICATIONS

This application is a continuation of U.S. application Ser. No. 16/131,268, filed Sep. 14, 2018, now allowed, which claims the benefit of U.S. Application No. 62/558,386, filed Sep. 14, 2017, the contents of which are incorporated by reference.

TECHNICAL FIELD

This specification generally relates to monitoring systems.

BACKGROUND

Many people equip homes and businesses with monitoring systems to provide increased security for the monitored property.

SUMMARY

Many people equip homes and businesses with monitoring systems to provide increased security for the monitored property. Many of these systems integrate devices that possess both a camera and a display screen, for instance, a doorbell unit with a camera and display screen placed at an entry point or an interface panel with camera and display screen used to electronically access a monitoring system control unit. The presence of both a camera and a display screen in a monitoring system unit enables point-to-point visual communications between that unit and another device, such as a mobile phone, that is also equipped with a camera and a display screen. These point-to-point visual communications can be used to accomplish various monitoring system functions, such as visitor authentication, system reconfiguration, and software upgrade. Visitor authentication may be useful when individuals other than the owner may need to access a monitored property, particularly when the owner is absent from the property. The subject matter of the present disclosure is related to systems and techniques for using point-to-point visual communications in a monitoring system.

According to an innovative aspect of the subject matter described in this specification, a monitoring system that is configured to monitor may use point-to-point visual communication. The monitoring system includes a doorbell unit that includes a camera and a display and that is configured to receive, from a visitor, a request to access the property; and a monitor control unit that is configured to, in response to the request to access the property and based on an armed status of the monitoring system, determine, from among multiple authentication protocols, an authentication protocol for determining whether to grant the visitor access to the property; based on the authentication protocol, generate a first image and transmit authentication data to a computing device; provide, to the doorbell unit, the first image and instructions to output the first image on the display of the doorbell unit; receive, from the doorbell unit, a second image captured by the camera of the doorbell unit; determine whether the second image includes a representation of data that is based on processing the first image in combination with the authentication data; and based on determining whether the second image includes the representation of data that is based on processing the first image in combination with the authentication data, grant or deny the visitor access to the property.

These and other implementations can each optionally include one or more of the following features. The monitor control unit is configured to receive, from the doorbell unit, the request to access the property. The monitor control unit is configured to determine whether the second image includes a representation of data that is based on processing the first image in combination with the authentication data by determining that the second image includes the representation of data that is based on processing the first image in combination with the authentication data; and grant or deny the visitor access to the property by granting the visitor access to the property based on determining that the second image includes the representation of data that is based on processing the first image in combination with the authentication data. The monitor control unit is configured to determine whether the second image includes a representation of data that is based on processing the first image in combination with the authentication data by determining that the second image does not include the representation of data that is based on processing the first image in combination with the authentication data; and grant or deny the visitor access to the property by denying the visitor access to the property based on determining that the second image does not include the representation of data that is based on processing the first image in combination with the authentication data.

The computing device is configured to process the first image in combination with the authentication data and output the second image on a display of the computing device. The monitor control unit is configured to, in response to the request to access the property, identify an expected visitor who is expected to visit the property; and, based on identifying the expected visitor who is expected to visit the property, identify, from among multiple computing devices, the computing device of the expected visitor. The doorbell unit is configured to receive, from an additional visitor, an additional request to access the property. The monitor control unit is configured to, in response to the additional request to access the property and based on a different armed status of the monitoring system, determine, from among the multiple authentication protocols, a different authentication protocol for determining whether to grant the additional visitor access to the property; based on the authentication protocol, receive, from the doorbell unit, a third image captured by the camera of the doorbell unit; determine whether the third image includes an additional representation of data that authenticates the additional visitor; and, based on determining whether the third image includes the additional representation of data that authenticates the additional visitor, grant or deny the additional visitor access to the property.

The third image includes data output on a display of a different computing device of the additional visitor. The armed status of the monitoring system is armed away or armed stay. The different armed status of the monitoring system is unarmed. The monitor control unit is configured to determine whether the third image includes an additional representation of data that authenticates the additional visitor by determining that the third image includes the additional representation of data that authenticates the additional visitor; and grant or deny the additional visitor access to the property by granting the additional visitor access to the property based on determining that the third image includes the additional representation of data that authenticates the additional visitor.

The monitor control unit is configured to determine whether the third image includes an additional representation of data that authenticates the additional visitor by determining that the third image does not include the additional representation of data that authenticates the additional visitor; and grant or deny the additional visitor access to the property by denying the additional visitor access to the property based on determining that the third image does not include the additional representation of data that authenticates the additional visitor. The first image and the second image are QR codes. The doorbell unit and the computing device communicate wirelessly using point-to-point visual communication. The monitoring system includes a sensor that is located in a vicinity of the doorbell unit and that is configured to collect biometric data. The doorbell unit is configured to receive, from an additional visitor, an additional request to access the property.

The monitor control unit is configured to, in response to the additional request to access the property and based on a different armed status of the monitoring system, determine, from among the multiple authentication protocols, a different authentication protocol for determining whether to grant the additional visitor access to the property; based on the authentication protocol, obtain, from the sensor, the biometric data of the additional visitor; based on the different authentication protocol, generate a third image and transmit additional authentication data to a computing device; provide, to the doorbell unit, the third image and additional instructions to output the third image on the display of the doorbell unit; receive, from the doorbell unit, a fourth image captured by the camera of the doorbell unit; determine whether the fourth image includes an additional representation of data that is based on processing the third image in combination with the additional authentication data; and, based on determining whether the fourth image includes the additional representation of data that is based on processing the third image in combination with the additional authentication data and based on the biometric data of the additional visitor, grant or deny the additional visitor access to the property. The monitor control unit is configured to, in response to the additional request to access the property, identify an additional expected visitor who is expected to visit the property; access biometric data of the additional expected visitor; compare the biometric data of the additional expected visitor to the biometric data of the additional visitor; and grant or deny the additional access to the property based further on comparing the biometric data of the additional expected visitor to the biometric data of the additional visitor. The armed status of the monitoring system is armed stay. The different armed status of the monitoring system is armed away.

Other embodiments of this aspect include corresponding systems, apparatus, and computer programs recorded on computer storage devices, each configured to perform the operations of the methods.

According to an innovative aspect of the subject matter described in this specification, a method for using point-to-point visual communication includes the actions of receiving, from a visitor and by a monitoring system that is configured to monitor a property and that includes a doorbell unit that includes a camera and a display, a request to access the property; in response to the request to access the property and based on an armed status of the monitoring system, determining, by the monitoring system and from among multiple authentication protocols, an authentication protocol for determining whether to grant the visitor access to the property; based on the authentication protocol, generating, by the monitoring system, a first image and transmit authentication data to a computing device; providing, to the doorbell unit of the monitoring system, the first image and instructions to output the first image on the display of the doorbell unit; receiving, from the doorbell unit of the monitoring system, a second image captured by the camera of the doorbell unit; determining, by the monitoring system, whether the second image includes a representation of data that is based on processing the first image in combination with the authentication data; and, based on determining whether the second image includes the representation of data that is based on processing the first image in combination with the authentication data, granting or denying, by the monitoring system, the visitor access to the property.

These and other implementations can each optionally include one or more of the following features. The computing device is configured to process the first image in combination with the authentication data and output the second image on a display of the computing device. The actions include, in response to the request to access the property, identifying an expected visitor who is expected to visit the property; and, based on identifying the expected visitor who is expected to visit the property, identifying, from among multiple computing devices, the computing device of the expected visitor. The first image and the second image are QR codes. The doorbell unit and the computing device communicate wirelessly using point-to-point visual communication.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A resident of a property may be able to use the monitoring system to authenticate a visitor when the resident is not at the property. The monitoring system may be able to user different authentication schemes depending on the armed state of the property.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
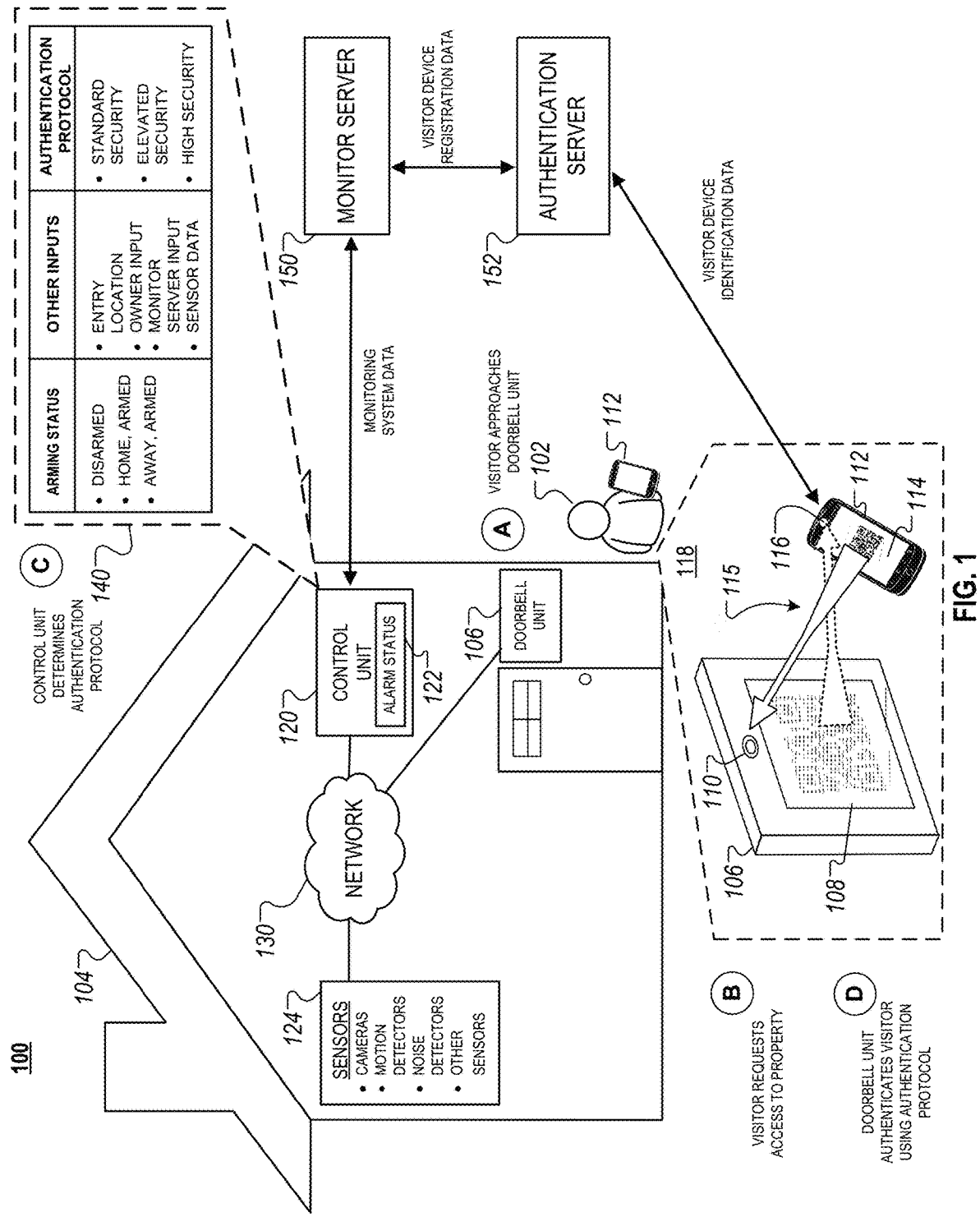
FIG. 1 is a diagram illustrating an example system for accessing a property using point-to-point visual communications in a security monitoring system.

FIG. 1 is a diagram illustrating an example system 100 for accessing a property using point-to-point visual communications in a security monitoring system. In system 100, a visitor requests access to a property via point-to-point visual communications between the visitor's mobile device and a doorbell unit. Upon receipt of the request, a monitoring system control unit determines the authentication protocol that will be applied to authenticate the visitor's identity. The control unit may determine the authentication protocol based on a variety of inputs, including an alarm status, the location of the entry request (e.g. at front door or a side gate), information provided by an owner or a monitor server, data from one or more sensors, or other inputs. After the control unit determines the authentication protocol, the doorbell unit performs the authentication protocol via point-to-point visual communications and determines whether to grant the visitor access. FIG. 1 includes stages (A) through (D) which depict an example process implemented by system 100.

In stage (A), a visitor 102, is visiting a property 104 (e.g. a home or business) that is monitored by a monitoring system. The visitor 102 may be a service provider, such as a technician, renovator, cleaner, repair person, or dog-walker; a first-responder, such as police or fire personnel; or another individual who desires access to the property.

To enter the property 104, the visitor 102 approaches an entry point equipped with an adjacent doorbell unit 106. The entry point may be located within the property 104 (e.g. a door to a house), on the perimeter of the property 104 (e.g. a gate at the driveway entrance), or outside the property 104 (e.g. a gate outside of the property). The doorbell unit 106 is equipped with a display screen 108, which can, for instance, comprise a liquid crystal display (LCD), a cathode ray tube (CRT) device, an organic light-emitting diode (OLED) panel, a thin film transistor (TFT) device, or other means for displaying visual information. The doorbell unit 106 is further equipped with a camera 110. The camera 110 may be integrated into the doorbell unit 106 or may be a separate device that is located in near proximity to the doorbell unit 106.

The visitor 102 has in her possession a mobile device 112, for instance a mobile phone, which is equipped with a display screen 114 and a camera 116. The display screen 114 may be a LCD, an OLED display, a TFT display, a touch screen device, or other means for visually displaying information. The camera 116 may be situated on the same side of the device as the display screen 114.

In stage (B), as depicted in inset 118, the visitor 102 requests access to the property 104. In some implementations, the visitor 102 may request access by placing the mobile device 112 in near proximity to the doorbell unit 106 such that the mobile device display screen 114 is visible to the doorbell unit camera 110. The mobile device 112 presents on its display screen 114 an optical code or codes that can be observed and captured by the doorbell unit camera 110, where information is encoded into the optical code. Here, the information encoded into the optical code is a request for access to the property 104. For instance, this optical code can be any one or combination of images, Quick Response (QR) codes, alphanumeric text, or other visual means of representing information. In some implementations, the optical code may be generated on the mobile device display screen 114 when the visitor 102 opens an application on her mobile device 112 or when she inputs a command to her mobile device 112. The optical code captured by the doorbell unit camera 110 is then processed by the doorbell unit 106 or the control unit 120 to extract the information encoded into the optical code. In this way, the visitor 102 submits a request for access to the property 104.

Capture of the optical code by the doorbell unit camera 110 can be initiated automatically, for instance where the doorbell unit camera 110 monitors its field of view for a recognized code. Alternatively, the capture can be initiated on-demand, for instance when the visitor 102 actuates a button on the doorbell unit 106 or otherwise communicates that an optical code is displayed for capture.

Communication of this sort, in which optical information presented on a display screen of a first device is captured by a camera of a second device is referred to herein as "point-to-point visual communication." The communication link formed between the camera and screen of a first device and the camera and screen of a second device in near proximity, where optically-encoded data can be exchanged via point-to-point visual communication, is referred to herein as a "point-to-point visual communication channel."

The visitor 102 may also request access to the property 104 by other methods. For example, the visitor 102 may ring a doorbell, press a button on the doorbell unit 106, or enter a code into the doorbell unit 106.

In some implementations, the doorbell unit 106 may similarly transmit information to the mobile device 112 over the point-to-point visual communication channel 115. For example, the doorbell unit 106 may present an optical code or codes on the doorbell unit display screen 108 that are captured by the mobile device camera 116. To capture the code present on the doorbell unit display screen 108, the mobile device camera 116 is placed in near proximity to the doorbell unit 106 in a direction facing the doorbell unit display screen 108. The mobile device 112 then processes the optical code to extract information encoded into the optical code.

Following receipt of the access request in stage (B), the doorbell unit 106 communicates the access request to a monitoring system control unit 120. The doorbell unit 106 communicates with the control unit 120 over a short-range, possibly through a network 130. The network 130 may be wired or wireless and may comprise a local area network (LAN), the Internet, WiFi, Bluetooth, or other means for short-range electronic communications.

As shown in inset 140, during stage (C), the control unit 120 determines the authentication protocol that will be used to determine whether to grant the visitor 102 access. The authentication protocols identified by the control unit 120 may be classified based on the level of confidence in the identity of the visitor 102 that is required. For instance, an authentication protocol may be classified as "standard security," "elevated security," or "high security," where a standard security protocol requires a moderate level of confidence in the identity of the visitor 102, an elevated security protocol requires a higher level of confidence in the identity of the visitor 102, and a high security protocol requires the highest level of confidence in the identity of visitor 102. Authentication protocols with other security levels or other protocol designations are also possible.

The authentication protocol determined by the control unit 120 may specify what type of authentication method will be used, how many authentication methods will be used, and other details of the authentication process. For instance, the authentication protocol may require that the identity of the visitor 102 be authenticated through optical access code verification, challenge/response, image comparison, or any combination of techniques. A variety of authentication protocols spanning different security levels are possible.

One example of a standard security authentication protocol is optical access code verification, where the doorbell unit 106 reads an optical access code presented by the mobile device 112. Based on that optical access code, the doorbell unit 106 or the control unit 120 determines whether to grant access to the visitor 102.

For example, the mobile device 112 may transmit an optical access code to the doorbell unit 106 via the point-to-point visual communication channel 115. Here, the mobile device 112 presents an optical access code on the mobile device display screen 114 in view of the doorbell unit camera 110. The optical access code could be, for instance, a QR code or other passcode, and the point-to-point visual communication is one-way, from the mobile device 112 to the doorbell unit 106. The optical access code may be stored on the mobile device 112 in advance of the access request, or it may be generated by the mobile device 112, for instance, when the visitor 102 initiates an action, such as opening a software application. The optical access code may also be communicated to the mobile device 112 by the authentication server 152 or other computer system. The doorbell unit camera 110 captures the optical access code presented by the mobile device display screen 114 and communicates the code to the control unit 120 or processes the captured code before communicating with the control unit 120. If the control unit 120 or the doorbell unit 106 determines that the optical access code corresponds to an authorized access code, the visitor 102 is granted access.

In this example, the mobile device 112 may have been preregistered with an authentication server 152. The authentication server 152 may provide the mobile device 112 with an authorized access code or with the information that the mobile device 112 needs to generate an authorized access code. The authentication server 152 may also communicate with the monitor server 150 to register the mobile device 112 as a device authorized to enter property 104. The monitor server 150 is remote from the property 104 and communicates with the control unit 120 over a long-range wired or wireless connection. The monitor server 150 may periodically provide the control unit 120 with an updated set of optical codes associated with authorized visitors.

While optical access code verification ensures only a visitor in possession of an authorized code may be granted access, any visitor 102 who holds an object that displays an authorized access code could be granted access to the property 104. The object could be the mobile device 112, a different mobile device, a sheet of paper, etc. When additional authentication of the visitor 102 or the mobile device 112 is desired, the control unit 120 may determine that an elevated or high security authentication protocol should be used.

One example of an elevated security authentication protocol is challenge/response, where the doorbell unit 106 presents a challenge to the mobile device 112 that requires a response from the mobile device 112. Based on the response from the mobile device 112, the control unit 120 determines whether to grant access to the visitor 102. The response provided by the mobile device 112 may verify the identity of the mobile device 112 and/or the identity of the visitor 102. In challenge/response, communication between the doorbell unit 106 and the mobile device 112 is two-way and takes place over the point-to-point visual communication channel 115.

For example, the doorbell unit screen 108 may present an optical code that, when captured by the mobile device camera 116, prompts the mobile device 112 to display a response code on the mobile device display screen 114. To generate the response code the mobile device 112 may communicate with the authentication server 152. For instance, the authentication server 152 may verify the identity and/or location of the mobile device 112 and provide the mobile device 112 with the information necessary to generate an authorized response code. Generating the response code may also require the visitor 102 to input data to mobile device 112. For example, the visitor 102 may have to enter a password into the mobile device 112 in order to generate an authorized response code. Once the mobile device 112 presents the optical response code, the doorbell unit camera 110 captures the optical response code via the point-to-point visual communication channel 115 and may communicate the code to the control unit 120. If the control unit 120 or the doorbell unit 106 recognizes the optical response code as an authorized response code, the visitor 102 is granted access to the property 104.

When additional verification of the identity of visitor 102 is desired, the control unit 120 may require that a high security authentication protocol be used. One example of a high security authentication protocol is where the control unit 120 requires an image comparison authentication, such as facial recognition, in addition to challenge/response. For example, after successfully performing challenge/response with the visitor mobile device 112 via the point-to-point visual communication channel 115, the doorbell unit 106 may capture an image of visitor 102 using the doorbell unit camera 110. The doorbell unit 106 or the control unit 120 then compares the captured image to one or more images of authorized visitors. The authentication protocol may specify a level of confidence that will be applied to the image comparison. For example, the authentication protocol may specify that the captured image of visitor 102 must match an image of an authorized visitor with 98% confidence in order to grant access to the visitor 102. If the control unit 120 or the doorbell unit 106 determines that the captured image of visitor 102 matches the image of an authorized visitor with at least the specified level of confidence, the visitor 102 may be granted access to the property 104.

As shown in inset 140, the control unit 120 may determine the authentication protocol to be used based on the alarm status 122 and other inputs. An alarm status may be set by the owner of the property 104 and can be one of multiple alarm states. The alarm status may indicate whether the owner is present on property 104 and/or the level of security required by the monitoring system 100. For example, an alarm status may be "disarmed," "home, armed," or "away, armed."

In addition to the alarm status 122, the control unit 120 may use one or more inputs to determine the authentication protocol that will be used. One example of an input that the control unit 120 may use is the entry location at which the visitor 102 requests access. For example, if the visitor 102 requests access to the yard of the property 104 at a gate, the control unit 102 may determine that a standard authentication protocol will be used. Alternatively, if the visitor 102 requests access to a house on the property 104 at a front door, the control unit 102 may determine that an elevated security authentication protocol must be used.

Another example of an input that the control unit 120 may use is information provided by the owner of the property 104 or by a monitor server 150. The information provided to the control unit 120 by the owner or by the monitor server 150 may include, for instance, whether a visitor is expected at the property 104. For example, if the owner schedules a repair person to visit the property 104 while the owner is absent from the property 104, the owner may indicate to the control unit 120 that a visitor is expected. If a visitor is expected, the control unit 120 may determine that a standard security authentication protocol will be used to determine whether to grant access to the visitor 102. Alternatively, if the owner has not indicated to the control unit 120 that a visitor is expected, the control unit 120 may determine that an elevated security authentication protocol will be used.

The control unit 120 may use any one or combination of inputs to determine the authentication protocol that will be used to determine whether to grant access to visitor 102.

As an example, if the visitor 102 requests access to the yard of the property 104 at a gate and the alarm status 122 is "disarmed," the control unit 120 may determine that a standard security authentication protocol, which requires a moderate level of confidence in the identity of the visitor 102, will be used. If the standard security authentication protocol required only optical access code verification, the visitor 102 would be required to display an authorized optical access code on their mobile device 112 to access the property 104.

Alternatively, if the visitor 102 requests access to the yard of the property 104 at a gate but the alarm status 122 is "home, armed," the control unit 120 may determine that an elevated security authentication protocol, which requires a higher level of confidence in the identity of visitor 102, will be used. In this example, the elevated security authentication protocol may require a challenge/response from the mobile device 112 in order to grant the visitor 102 access to the property 104.

As another example, if the alarm status 122 is "away, armed" and the owner has indicated to the control unit 120 that a visitor expected, the control unit 120 may determine that an elevated security authentication protocol, which requires a challenge/response from the mobile device 112, will be used to authenticate the visitor 102. Alternatively, if the alarm status 122 is "away, armed" and the owner has not indicated to the control unit 120 that a visitor is expected, the control unit 120 may determine that a high security authentication protocol, which requires the highest level of confidence in the identity of the visitor 102, will be used. Here, the high security authentication protocol may require facial recognition of the visitor 102.

In stage (D), the doorbell unit performs the authentication protocol determined by the control unit 120. Through the authentication protocol, if the control unit 120 determines that the visitor 102 is authorized to enter, the control unit can grant visitor 102 access to the property 104.

The diagram of FIG. 1 illustrates an example where stages (A) through (D) are performed sequentially to determine whether the visitor 102 can access the property 104. Here, the visitor 102 approaches the doorbell unit 106 (A), the visitor 102 requests access to the property 104 (B), the control unit 120 determines the authentication protocol to be used (C), and the doorbell unit 106 authenticates the visitor 102 via the determined protocol (D). Other implementations may order the stages differently, may omit stages, or may add stages.

For example, in some implementations, the control unit 120 may determine the authentication protocol (C) before the visitor 102 requests access (B). For instance, if the alarm status is "away, armed" and the owner has not indicated that a visitor is expected, the control unit 120 may determine that any visitor at any entry point will be subject to a high security authentication protocol. As another example, some implementations may not require the visitor to request access (B). For instance, the doorbell unit 106 may automatically detect the presence of a visitor, possibly through the doorbell unit camera 110 or other sensor 124. In some implementations, any actions performed by any of the control unit 120, the doorbell unit 106, monitoring server 150, the authentication server 152, or the mobile device 112 can be performed by any of the control unit 120, the doorbell unit 106, monitoring server 150, the authentication server 152, or the mobile device 112.

Using point-to-point visual communications in security monitoring systems to determine access provides advantages relative to other techniques. Point-to-point visual authentication is more convenient than other methods because it uses a mobile device that the visitor is likely to already be carrying, rather than requiring her to carry an additional fob, key, card, or other authentication component. Because they do not require any physical contact between the visitor and the entry point, point-to-point visual authentication methods are less susceptible to degradation from wear than techniques that require inserting a key or swiping a card. Additionally, point-to-point visual authentication can provide greater certainty in visitor identity, as it naturally supports facial recognition and other image comparison-based authentication methods that provide high-confidence identity verification.

Point-to-point visual authentication methods can also be more secure than other techniques. As communication is entirely visual, there are no electronic transmissions that can be intercepted by a third party, and interference, such as intentionally blocking the visual communications channel, is easily detected. The point-to-point visual communication channel is limited to a short distance and narrow field of view defined by the characteristics of the cameras and display screens of the communicating devices, making it difficult for a third party to observe optical codes exchanged between the devices. The optical access codes presented by the devices can be updated frequently and even issued at the time of the access request, preventing use of stale codes by unauthorized visitors.

Figure 2:
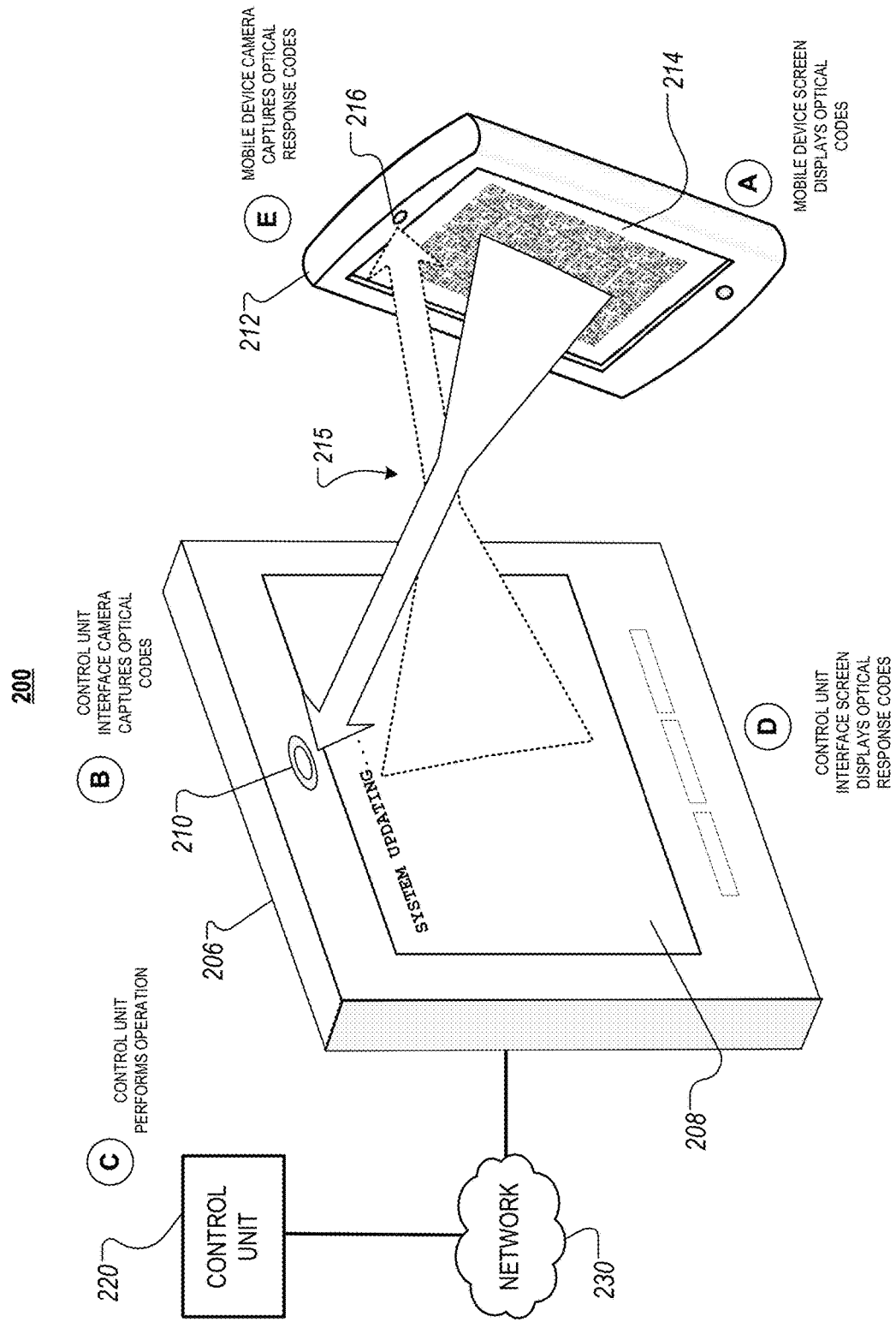
FIG. 2 is a diagram illustrating an example system for non-intrusive system service using point-to-point visual communications in a monitoring system.

Point-to-point visual communications can also be used in monitoring systems to accomplish functions other than visitor authentication for property access. FIG. 2 is a diagram illustrating an example of a system 200 for non-intrusive system service using point-to-point visual communications in a monitoring system. In FIG. 2, an authorized servicer present at a property is able to implement a service task on the control unit of a property monitoring system by communicating with that control unit via point-to-point visual communications. A service task may be, for instance, updating firmware on the control unit or recovering software on the control unit after malfunction. A service task may include any operation applied to software, firmware, hardware, or other component of the control unit or property monitoring system. By communicating with the control unit via point-to-point visual communications, the authorized servicer does not require a network connection or physical connection to the control unit in order to implement service process. FIG. 2 includes stages (A) through (E) which depict an example of a service task implemented by system 200.

The system 200 includes a control unit interface 206 and a control unit 220 that are part of a property monitoring system. The property monitoring system may be located at a residence, a place of business, or another property. The control unit interface 206 possess both a display screen 208 and a camera 210. The display screen 208 may include, for instance, a LCD, a CRT, an OLED panel, a TFT display, or other means for displaying visual information. The control unit interface 206 communicates electronically over a short range with a control unit 220. The control unit interface 212 may communicate with the control unit 220 through a network 230. The network 230 may be wired or wireless and may comprise a LAN, the Internet, WiFi, Bluetooth, or other means for short-range electronic communications.

The mobile device 212 is used by the authorized servicer to communicate with the control unit interface 206 via a point-to-point visual communication channel 215. The mobile device 212 possesses both a display screen 214 and a camera 216. The mobile device 212 may be, for instance, a mobile phone or a tablet computing device. The display screen 214 may be a LCD, an OLED display, a TFT display, a touch screen device, or other means for displaying visual information. The camera 216 may be situated on the same side of the mobile device 212 as the display screen 214. The authorized servicer may carry the mobile device 212 to the monitored property or the mobile device 212 may be resident at the monitored property.

In some implementations, the mobile device 212 and/or the control unit 220 authenticates the authorized servicer on site at the monitored property to allow the performance of service tasks via point-to-point visual communication with the control unit 220. For example, the mobile device 212 may require the authorized servicer to input a password to the mobile device 212. The mobile device 212 may also authenticate the authorized servicer by other means, including using biometric parameters, such as a finger print or facial recognition.

The control unit 220 may also require authentication of the authorized servicer prior to allowing the performance of service tasks. In some implementations, the control unit 220 may authenticate the authorized servicer using an authentication protocol such as those used by system 100 of FIG. 1. For example, if the authorized servicer is from the monitoring system company, the control unit 220 may require a standard security authentication protocol, where the authorized servicer must present an authorized optical access code on his mobile device 212 in order to perform the service tasks. Alternatively, if the authorized servicer is not from the monitoring system company but from a third party company, the control unit 220 may require the a high security authentication protocol, where the authorized servicer must be authenticated through challenge/response and facial recognition.

The authorized servicer can transmit information from the mobile device 212 to the control unit interface 206 via the point-to-point visual communication channel 215 between the mobile device 212 and the control unit interface 206. For example, the authorized servicer can place the mobile device 212 in near proximity to the control unit interface 206 such that the mobile device display screen 214 is visible to the control unit interface camera 210. The mobile device 212 presents on its display screen 214 an optical code or codes that can be captured by the control unit interface camera 210. For example, this optical code can be any combination of one or more images, QR codes, alphanumeric text, or other visual means of representing information. In some implementations, the optical code may be generated on the mobile device display screen 214 when the authorized servicer opens an application on the mobile device 212 or inputs a command to the mobile device 212. The control unit interface camera 210 captures the optical code presented on the mobile device display screen 214. The control unit interface 206 or the control unit 220 processes the code to extract information encoded into the optical code. In this way information is transmitted from the mobile device 212 to the control unit interface 206 and/or the control unit 220 over the point-to-point visual communication channel 215. Capture of the optical code by the control unit interface camera 210 can be initiated automatically, for instance where the control unit interface camera 210 monitors its field of view for a recognized code. Alternatively, the capture can be initiated on-demand, for instance when the authorized servicer presses a button on the control unit interface 206 or otherwise indicates that an optical code is displayed for capture.

In some implementations, the control unit interface 206 may similarly transmit information to the mobile device 212 over the point-to-point visual communication channel 215. For example, the control unit interface 206 may present an optical code or codes on the control unit interface display screen 208 that are captured by the mobile device camera 216, where the mobile device 212 is placed in near proximity to the control unit interface 206 such that the mobile device camera 216 is facing the control unit interface display screen 108.

The information transmitted by the mobile device 212 to the control unit interface 206 may include authentication information, data, commands, queries, replies to queries, and other information. Likewise, information transmitted by the control unit interface 206 to the mobile device 212 may include authentication information, data, commands, queries, replies to queries, and other information. Information may be transmitted concurrently, for example, where a set of several codes appear simultaneously on the mobile device display screen 214 and the set of code are captured simultaneously by the control unit interface camera 210. Information may also be transmitted sequentially, for example, where a series of codes or sets of codes appear one-at-a-time on the mobile device display screen 214 and each code or set of codes is captured by the control unit interface camera 210 in the sequence in which it appears.

By communicating information via the point-to-point visual communication channel 215 between the mobile device 212 and the control unit interface 206, the authorized servicer can implement service tasks on the property monitoring system control unit 220. An example of system 200 implementing a service task via the point-to-point visual communication channel 215 is depicted in stages (A) through (E) in FIG. 2.

In stage (A), the mobile device 212 displays one or more optical codes representing servicing queries or commands on the mobile device display screen 214. For example, the codes may represent a query for information on the current version of software contained within the control unit 220. As another example, the codes may represent a series of commands that instruct the control unit 220 to update certain software within the control unit 220. The codes may also represent commands and data that instruct the control unit 220 how to update certain software. The mobile device display screen 214 may display the one or more codes concurrently or sequentially. The mobile device 212 may also generate the one or more optical codes when prompted by input to the mobile device 212 by the authorized servicer. When displaying the one or more codes, the mobile device 212 is in near proximity to the control unit interface 206, such that the mobile device display screen 214 is visible to the control unit interface camera 210.

In stage (B), the control unit interface camera 210 captures the one or more optical codes displayed on the mobile device display screen 214. The control unit interface camera 210 may capture the one or more codes sequentially or concurrently. The control unit interface 206 then transmits the codes, or a decoded version of the codes, to the control unit 220, possibly via the network 230.

In stage (C), the control unit 220 may perform one or more operations in response to the optical codes displayed by the mobile device 212. For example, if the optical codes displayed by the mobile device 212 represent a query for the current version of software installed on control unit 220, the control unit 220 may send information to the control unit interface 206 indicating the current version of software. As another example, if the optical codes displayed by the mobile device 212 represent commands to update software installed on control unit 220, the control unit 220 may perform the necessary operations to update the software as commanded.

In stage (D), the control unit interface 206 may transmit information to the mobile device 212 via the point-to-point visual communication channel 215 by displaying one or more optical response codes on the control unit interface display screen 208. For example, the control unit interface display screen 208 may display a response code that represents a reply to a query, for instance, that software version 2.0 is currently installed. As another example, the control unit display screen 208 may display a response code that indicates an operation is complete, for instance, that the control unit 220 has completed updating its software. As a third example, the control unit display screen 208 may display a response code that indicates it was unable to capture or decode the previous code presented to it.

In stage (E), the mobile device camera 216 reads the one or more optical response codes displayed by the control unit interface display screen 208. The mobile device 212 may perform an operation based on the one or more optical response codes. For example, if the optical response code indicates that the installed software version is out-of-date, the mobile device 212 may display one or more optical codes that instruct the control unit 220 to update its software. As another example, if the optical response code indicates that the control unit 220 has completed the commanded operation, the mobile device 212 may cease visual transmission of data across the point-to-point visual communication channel 215. As a third example, if the optical response code indicates that the control unit was unable to decode an optical code, the mobile device 212 may resend an optical code by displaying it again on the mobile device display screen 214.

The process described by stages (A) through (E) may be repeated one or more times as necessary to complete one or multiple service tasks.

The system 200 for non-intrusive system service using point-to-point visual communications in a monitoring system has several advantages over alternative approaches for system service. One common method to perform service tasks is to physically connect an external device to the control unit through a USB port on the control unit interface. Once connected, the external device communicates with the control unit to perform the desired service task. The external device can be, for instance, a laptop computer or a USB memory device. Physically connecting an external device to the control unit or control unit interface through a USB port can pose severe security risks to the control unit. For example, the USB firmware of the external device can be modified to surreptitiously install malicious software on the control unit, even if the control unit is running anti-malware software. Alternatively, in system 200, because information is exchanged via point-to-point visual communications, there is no physical connection between the mobile device and the control unit, preventing surreptitious installation of malicious software via USB-type connections.

Another common method to perform service tasks is to connect an external device to the control unit through a network connection. Once connected, the external device, which may be a computer or a server, communicates with the control unit to perform the desired service task. However, if the network communication between the external device and the control unit over is disrupted, the service task may not complete. Network communication may be disrupted by a variety of causes, including failure of a specific network hardware component such as a router, a network security attack, a failed upgrade, a power-outage, or a physical breach in the network. Alternatively, because system 200 does not rely on a network for communications between the mobile device and the control unit, service tasks can be completed even in the case of network disruption or failure.

The use of point-to-point visual communications is not limited to monitoring systems, but can be applied more broadly to systems requiring information transfer between two devices, where at least one device possesses a camera and the second device possesses a display screen. Data can be encoded into optical codes that are transmitted over a visual point-to-point communication channel between the devices. Optical codes can include images, videos, or any other visual representation of data. Data communication in a point-to-point visual communication system can be one-way, where the display screen of one device presents optical codes that are captured by the camera of a second device. If both devices possess a camera and a display screen, data communication can also be two-way, where both devices capture and display optically-encoded information. Two-way communication can be half-duplex, where at a given time a device either displays an optical code on its display screen or captures an optical code with its camera. Two-way communication can also be full-duplex, where at a given time a device both displays an optical code on its display screen and captures an optical code with its camera.

For example, point-to-point visual communications can be used to enable data transfer between a desktop computer and a mobile device, where the mobile device is held in near proximity to the computer such that the display screen of each is visible to the camera of the other. Point-to-point visual communications can also be used to support data sharing between two mobile devices, where the mobile devices are held facing one another, such that the display screen of each is visible to the camera of the other.

Using point-to-point visual communications for data transfer between devices offers several advantages over conventional methods for data exchange. Point-to-point visual methods do not require a physical connection between the devices, eliminating the need for wires, connectors, or other physical equipment that can fail or damage a device. Point-to-point visual communication methods are also more convenient, as no additional equipment, such as adapters, connectors, or cords, are required to exchange data. Furthermore, point-to-point visual communication methods are more secure than many conventional data transfer techniques. With no physical connection between the devices, the risk of malicious software installation or virus infection decreases, while the short-range nature of the point-to-point visual communication channel makes transmissions more difficult for a third party to intercept or block.

Figure 3:
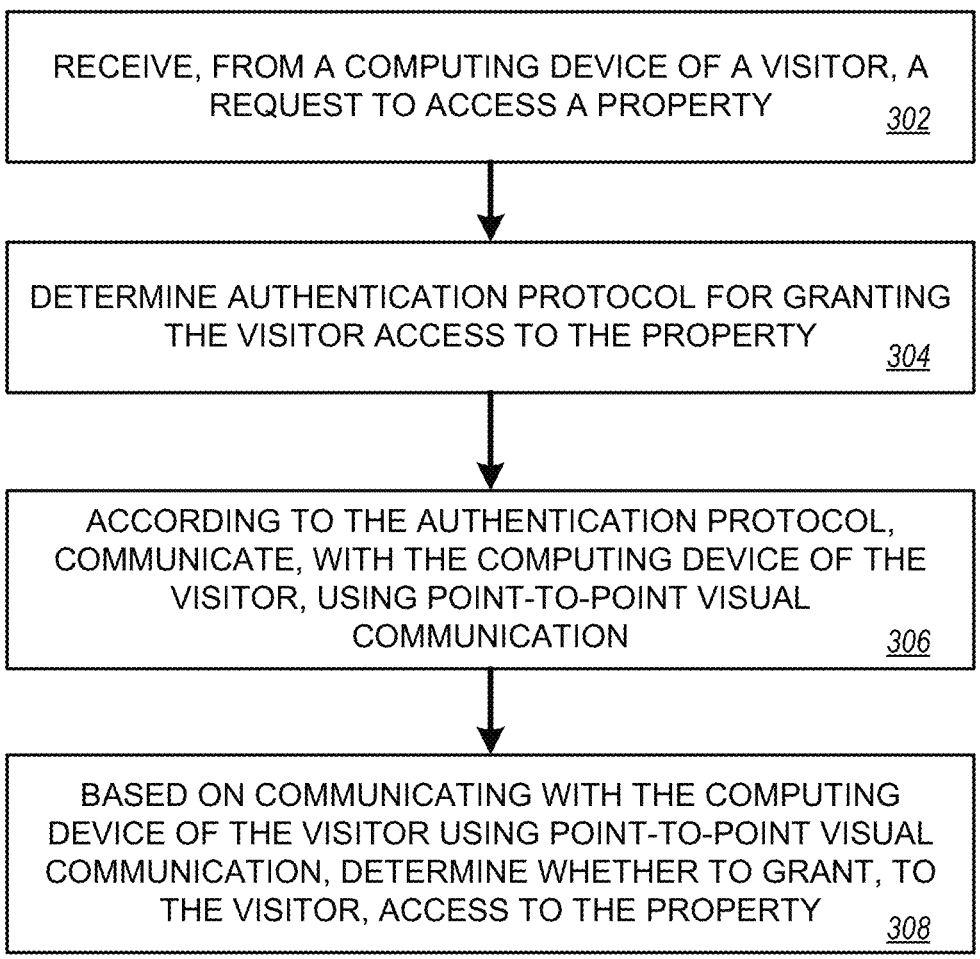
FIG. 3 is a flowchart illustrating an example process for accessing a property using point-to-point visual communications in a security monitoring system.

FIG. 3 is a flowchart illustrating an example process 300 for accessing a property using point-to-point visual communications in a security monitoring system. Through process 300, a monitoring system determines and applies an authentication protocol to a visitor visiting a property, where the authentication protocol uses point-to-point visual communications. Based on the outcome of the authentication protocol, the monitoring system determines whether to grant the visitor access to the property. In some implementations, the monitoring system includes a doorbell unit, which possess both a camera and a display screen.

In process 300, the monitoring system receives, from a computing device of a visitor, a request to access a property (302). The visitor's computing device may be, for example, a mobile phone, tablet computer, or other mobile computing device that is equipped with a camera and a display screen. The visitor may request access to the property through point-to-point visual communications between the visitor's computing device and the doorbell unit. The visitor may also request access to the property by ringing a doorbell or entering a code into the doorbell unit. The monitoring system may also receive an access request by detecting the presence of the visitor, for example, through images captured by a monitoring system camera or motion detected by a monitoring system sensor.

Based on the monitoring system alarm status and other inputs, the monitoring system determines the authentication protocol for granting the visitor access to the property (304). For example, if the alarm status is "home, disarmed," the monitoring system may determine that a standard security authentication protocol, which requires a moderate level of confidence in the identity of the visitor, will be applied. As another example, if the alarm status is "away, disarmed", the monitoring system may determine that an elevated security authentication protocol, which requires a higher level of confidence in the identity of the visitor, will be applied. The monitoring system may determine the authentication protocol before or after receiving the access request from the visitor.

According to the authentication protocol, the monitoring system communicates with the computing device of the visitor using point-to-point visual communication (306). For example, the monitoring system may determine that an elevated security authentication protocol requiring an optical challenge/response will be used. The doorbell unit of the monitoring system then communicates a challenge to the visitor's computing device by displaying an optical code on the doorbell unit display screen, which is captured by the camera of the visitor's computing device. The visitor's computing device processes the code and presents an optical response code on its display screen. The doorbell unit camera then captures the optical response code displayed on the display screen of the visitor's computing device.

Based on communicating with the computing device of the visitor using point-to-point visual communication, the monitoring system determines whether to grant the visitor access to the property (308). In the example of the challenge/response authentication protocol above, if the monitoring system determines that the optical response code displayed by the visitor's computing device is an authorized response code, the monitoring system may grant the visitor access to the property. If the monitoring system determines that the optical response code displayed by the visitor's computing device is not an authorized response code, the monitoring system may deny the visitor access to the property.

Figure 4:
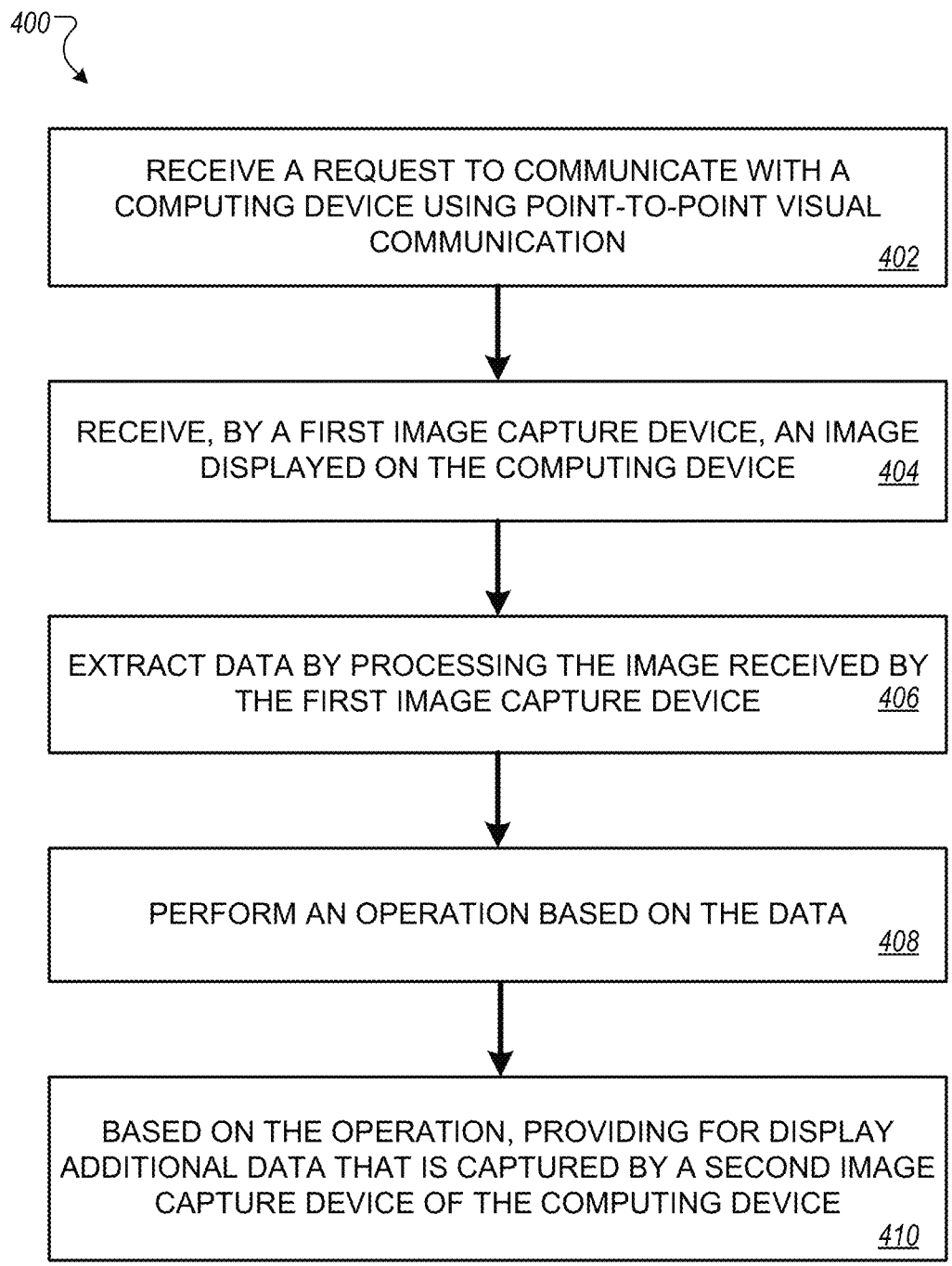
FIG. 4 is a flowchart illustrating an example process for performing non-intrusive system service using point-to-point visual communications in a monitoring system.

FIG. 4 is a flowchart illustrating an example process 400 for performing non-intrusive system service using point-to-point visual communications in a monitoring system. In process 400, the monitoring system exchanges data with a computing device using point-to-point visual communications and, based on that data, performs system operations that may include updating software, reconfiguring settings, or other functions. In some implementations, the monitoring system includes a control unit, as well as a control unit interface, where the control unit interface possesses both a camera and a display screen. The control unit interface enables a computing device to exchange data with the monitoring system through point-to-point visual communications.

In process 400, the monitoring system receives a request to communicate with a computing device using point-to-point visual communication (402). The computing device may be, for instance, a mobile phone, a tablet computer, a laptop computer, or other computing device that contains both a camera and a display screen. The communication request may be indicated through point-to-point visual communications between the computing device and the control unit interface. The communication request may also be indicated by pressing a button on the control unit interface or entering a code into the control unit interface.

The monitoring system then receives, from a first image capture device, an image displayed on the computing device (404). The first image capture device may be, for instance, a camera integrated into the control unit interface. The first image capture device may also be a camera separate from the control unit interface, but located in near proximity to it. The image displayed on the computing device may be an optical code, such as a QR code, alphanumeric text, an image, or other means of visually encoding information. For example, the computing device may display an optical code that represents a command to the monitoring system to update its software.

After receiving the image, the monitoring system extracts data by processing the image received by the capture device (406). The image may be processed by the control unit or by another computer within the monitoring system. The data extracted by processing the image may include commands, queries, or other information.

Based on the data extracted from the image, the monitoring system performs an operation (408). For example, if the data extracted from the image represents a command to update software, the monitoring system may then perform the indicated software update.

Based on the operation performed, the monitoring system may display additional data that is captured by a second image capture device of the computing device (410). The monitoring system may display the additional data as an image on a display screen associated with the monitoring system, for instance, on the display screen of the control unit interface. The second image capture device may be, for example, a camera integrated into the computing device. The image displayed by the monitoring system may be an optical code or codes, alphanumeric text, or other image containing the data to be communicated to the computing device.

Some or all of the stages (402) through (410) may repeat until the required monitoring system operation or operations are complete.

The process 400 can be "half-duplex" point-to-point visual communication, where display and capture of optical codes alternates between the two parties. For example, at a given time, one party may display a first optical code on its display screen while a second party captures that optical code with its camera. At some time after capture, the second party displays a second optical code on its display screen while the first party captures that optical code with its camera. In half-duplex point-to-point visual communication, a given party either displays or captures at a given time. In addition, the process 400 can be "full-duplex" point-to-point visual communication, where each party both displays and captures optical codes simultaneously. For example, at a given time, one party may display a first optical code on its display screen while a second party captures that optical code with its camera. At the same time, the second party displays a second optical code on its display screen while the first party captures that optical code with its camera. In full-duplex point-to-point visual communication, a given party both displays and captures at a given time.

Even though the point-to-point visual communication requires a short distance between two communicating parties, the ambient light conditions vary dramatically in field environments, which may impact the ability of a camera to capture an optical code. Moreover, cameras and display screens are of different qualities. Even under identical ambient light conditions, different pairs of cameras and display screens may require different settings to transfer data reliably via the point-to-point visual communication channel.

In order to maximize reliable data transfer between two parties, at the beginning of and/or throughout the course of communication, the point-to-point visual communication process 400 may allow parties to adapt camera parameters for a given camera-display screen pair and environment. For example, the process 400 may allow the parties to alter camera parameters including, but not limited to, focal length, mechanical/electronic shutter speed, aperture, and exposure to maximize reliable data transfer via the point-to-point visual communication channel.

In addition, different optical codes may have different characteristics that impact how reliably data encoded into the optical code is transferred via the point-to-point visual communication channel. For example, an optical code or image may encode information based on features that vary in pattern, color, and density. Particularly, optical codes or images with more colors or denser features can potentially encode a larger amount of information. However, for a given camera-display screen pair, a more colorful denser optical code may be more susceptible to error than a less colorful, less dense optical code that encodes a lesser amount of information.

In order to maximize reliable data transfer between two parties, at the beginning of and/or throughout the course of communication, the point-to-point visual communication process 400 may also allow the parties to adapt or modify the characteristics of the optical code, image, alphanumeric text, or other visual representation of information. One example of a way to adapt optical codes or images to a particular camera-display screen pair and environment is to start with a reliable communication process at a low data rate using optical codes comprised of low density black-white patterns. The data rate can then be gradually increased by incrementally reducing pattern size, increasing feature density, or increasing the number of colors contained within the optical code, so that each optical code encodes more information than the last. The optical code can gradually be modified in this way until a certain error criteria is reached and reliable data transfer via the point-to-point visual communication channel has been maximized.

Figure 5:
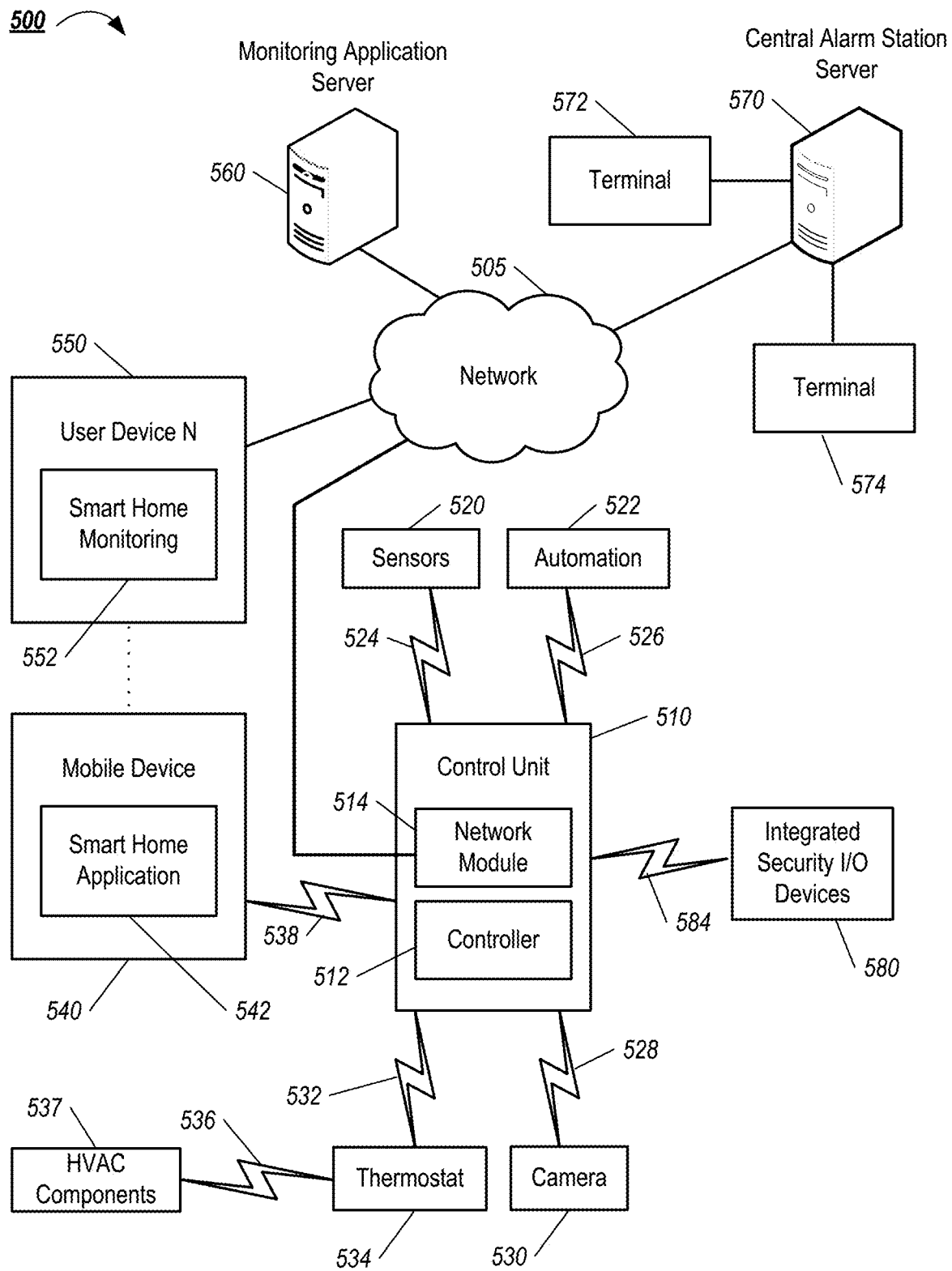
FIG. 5 is a block diagram of an example security monitoring system.

FIG. 5 is a block diagram of an example security monitoring system 500. The electronic system 500 includes a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voiceband modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit 510 communicates with the module 522 and the camera 530 to perform monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the control unit 510. For instance, the module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a residential facility 102-A monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 500 for use in appropriate circumstances. For instance, a robotic vacuum cleaner device may be associated with the monitoring system 500 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 510, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 510. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 500. For instance, after completion of a monitoring operation or upon instruction by the control unit 510, the robotic devices may be configured to automatically fly to and land on one of the charging stations. In this regard, the robotic devices may automatically maintain a fully charged battery in a state in which the robotic devices are ready for use by the monitoring system 500.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the control unit 510, the one or more user devices 540 and 550, and the central alarm station server 570 over the network 505. For example, the monitoring application server 560 may be configured to monitor events (e.g., alarm events) generated by the control unit 610. In this example, the monitoring application server 560 may exchange electronic communications with the network module 514 included in the control unit 510 to receive information regarding events (e.g., alerts) detected by the control unit 510. The monitoring application server 560 also may receive information regarding events (e.g., alerts) from the one or more user devices 540 and 550.

In some examples, the monitoring application server 560 may route alert data received from the network module 514 or the one or more user devices 540 and 550 to the central alarm station server 570. For example, the monitoring application server 560 may transmit the alert data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, and the monitoring application server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring application server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (Ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
 a camera located at an entry point of the property;
 a display located at the entry point of the property; and
 a controller that is configured to:
  receive, from a user, a request to access the property using the entry point;
  in response to the request to access the property using the entry point, generate a first image and transmit authentication data to a computing device of the user;
  control the display to display the first image;
  receive a second image captured by the camera;
  determine whether the second image includes a representation of data that is based on processing the first image in combination with the authentication data; and
  based on determining whether the second image includes the representation of data that is based on processing the first image in combination with the authentication data, grant or deny the user access to the property using the entry point.

2. The monitoring system of claim 1, wherein the controller is configured to:

determine whether the second image includes a representation of data that is based on processing the first image in combination with the authentication data by determining that the second image includes the representation of data that is based on processing the first image in combination with the authentication data; and grant or deny the user access to the property using the entry point by granting the user access to the property based on determining that the second image includes the representation of data that is based on processing the first image in combination with the authentication data.

3. The monitoring system of claim 1, wherein the controller is configured to:

determine whether the second image includes a representation of data that is based on processing the first image in combination with the authentication data by determining that the second image does not include the representation of data that is based on processing the first image in combination with the authentication data; and grant or deny the user access to the property using the entry point by denying the user access to the property based on determining that the second image does not include the representation of data that is based on processing the first image in combination with the authentication data.

4. The monitoring system of claim 1, wherein the computing device is configured to process the first image in combination with the authentication data and output the second image on a display of the computing device.

5. The monitoring system of claim 1, wherein the controller is configured to:

in response to the request to access the property, identify an expected visitor who is expected to visit the property; and based on identifying the expected visitor who is expected to visit the property, identify, from among multiple computing devices, the computing device of the expected visitor.

6. The monitoring system of claim 1, wherein the first image and the second image are QR codes.

7. The monitoring system of claim 1, wherein the computing device communicates wirelessly using point-to-point visual communication with the camera and the display.

8. The monitoring system of claim 1, comprising:

a sensor that is located at the entry point and that is configured to collect biometric data, wherein the controller is configured to:

receive, from an additional user, an additional request to access the property;

obtain, from the sensor, the biometric data of the additional user;

generate a third image and transmit additional authentication data to an additional computing device of the additional user;

control the display to display the third image;

receive a fourth image captured by the camera;

determine whether the fourth image includes an additional representation of data that is based on processing the third image in combination with the additional authentication data; and based on determining whether the fourth image includes the additional representation of data that is based on processing the third image in combination with the additional authentication data and based on the biometric data of the additional user, grant or deny the additional user access to the property using the entry point.

9. The monitoring system of claim 8, wherein the controller is configured to:

in response to the additional request to access the property, identify an additional expected visitor who is expected to visit the property;

access biometric data of the additional expected visitor;

compare the biometric data of the additional expected visitor to the biometric data of the additional user; and grant or deny the additional access to the property using the entry point based further on comparing the biometric data of the additional expected visitor to the biometric data of the additional user.

10. The monitoring system of claim 1, wherein the controller is configured to determine, from among multiple authentication protocols, an authentication protocol for determining whether to grant the user access to the property based on an armed status of the monitoring system.

11. A method comprising:

a camera located at an entry point of the property;

a display located at the entry point of the property; and a controller that is configured to:

receiving, by a controller and from a user, a request to access a property using an entry point of the property;

in response to the request to access the property using the entry point, generating a first image and transmitting authentication data to a computing device of the user;

controlling, by the controller, a display to display the first image, the display being located at the entry point of the property;

receiving a second image captured by a camera located at the entry point of the property;

determining, by the controller, whether the second image includes a representation of data that is based on processing the first image in combination with the authentication data; and based on determining whether the second image includes the representation of data that is based on processing the first image in combination with the authentication data, granting or denying, by the controller, the user access to the property using the entry point.

12. The method of claim 11:

wherein determining whether the second image includes a representation of data that is based on processing the first image in combination with the authentication data comprises determining that the second image includes the representation of data that is based on processing the first image in combination with the authentication data; and wherein granting or denying the user access to the property using the entry point comprises granting the user access to the property based on determining that the second image includes the representation of data that is based on processing the first image in combination with the authentication data.

13. The monitoring system of claim 11:

wherein determining whether the second image includes a representation of data that is based on processing the first image in combination with the authentication data comprises determining that the second image does not include the representation of data that is based on processing the first image in combination with the authentication data; and wherein granting or denying the user access to the property using the entry point comprises denying the user access to the property based on determining that the second image does not include the representation of data that is based on processing the first image in combination with the authentication data.

14. The method of claim 11, wherein receiving the second image comprises receiving the second image displayed on a display of the computing device, the computing device being configured to process the first image in combination with the authentication data and output the second image.

15. The method of claim 11, comprising:
in response to the request to access the property, identifying an expected visitor who is expected to visit the property; and
based on identifying the expected visitor who is expected to visit the property, identifying, from among multiple computing devices, the computing device of the expected visitor.

16. The method of claim 11, wherein the first image and the second image are QR codes.

17. The method of claim 11, further comprising communicating, by the computing device, wirelessly using point-to-point visual communication with the camera and the display.

18. The method of claim 11, comprising:
receiving, from an additional user, an additional request to access the property;
obtaining, from a sensor that is located at the entry point and that is configured to collect biometric data, the biometric data of the additional user;
generating a third image and transmitting additional authentication data to an additional computing device of the additional user;
controlling the display to display the third image;
receiving a fourth image captured by the camera;
determining whether the fourth image includes an additional representation of data that is based on processing the third image in combination with the additional authentication data; and
based on determining whether the fourth image includes the additional representation of data that is based on processing the third image in combination with the additional authentication data and based on the biometric data of the additional user, granting or denying the additional user access to the property using the entry point.

19. The method of claim 18, further comprising:
in response to the additional request to access the property, identifying an additional expected visitor who is expected to visit the property;
accessing biometric data of the additional expected visitor;
comparing the biometric data of the additional expected visitor to the biometric data of the additional user; and
granting or denying the additional access to the property using the entry point based further on comparing the biometric data of the additional expected visitor to the biometric data of the additional user.

20. The method of claim 11, further comprising determining, from among multiple authentication protocols, an authentication protocol for determining whether to grant the user access to the property based on an armed status of the monitoring system.

* * * * *

UNITED STATES PATENT AND TRADEMARK OFFICE
CERTIFICATE OF CORRECTION

PATENT NO. : 11,134,228 B1  
APPLICATION NO. : 16/852000  
DATED : September 28, 2021  
INVENTOR(S) : Lang Lin Page 1 of 1

It is certified that error appears in the above-identified patent and that said Letters Patent is hereby corrected as shown below:

In the Claims

In Claim 11, Column 30, Lines 22-24, delete:
"a camera located at an entry point of the property;
a display located at the entry point of the property; and
a controller that is configured to:", therefor.

In Claim 13, Column 30, Line 58, delete:
"monitoring system" and replace with "method,", therefor.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*